UNITED STATES PATENT OFFICE.

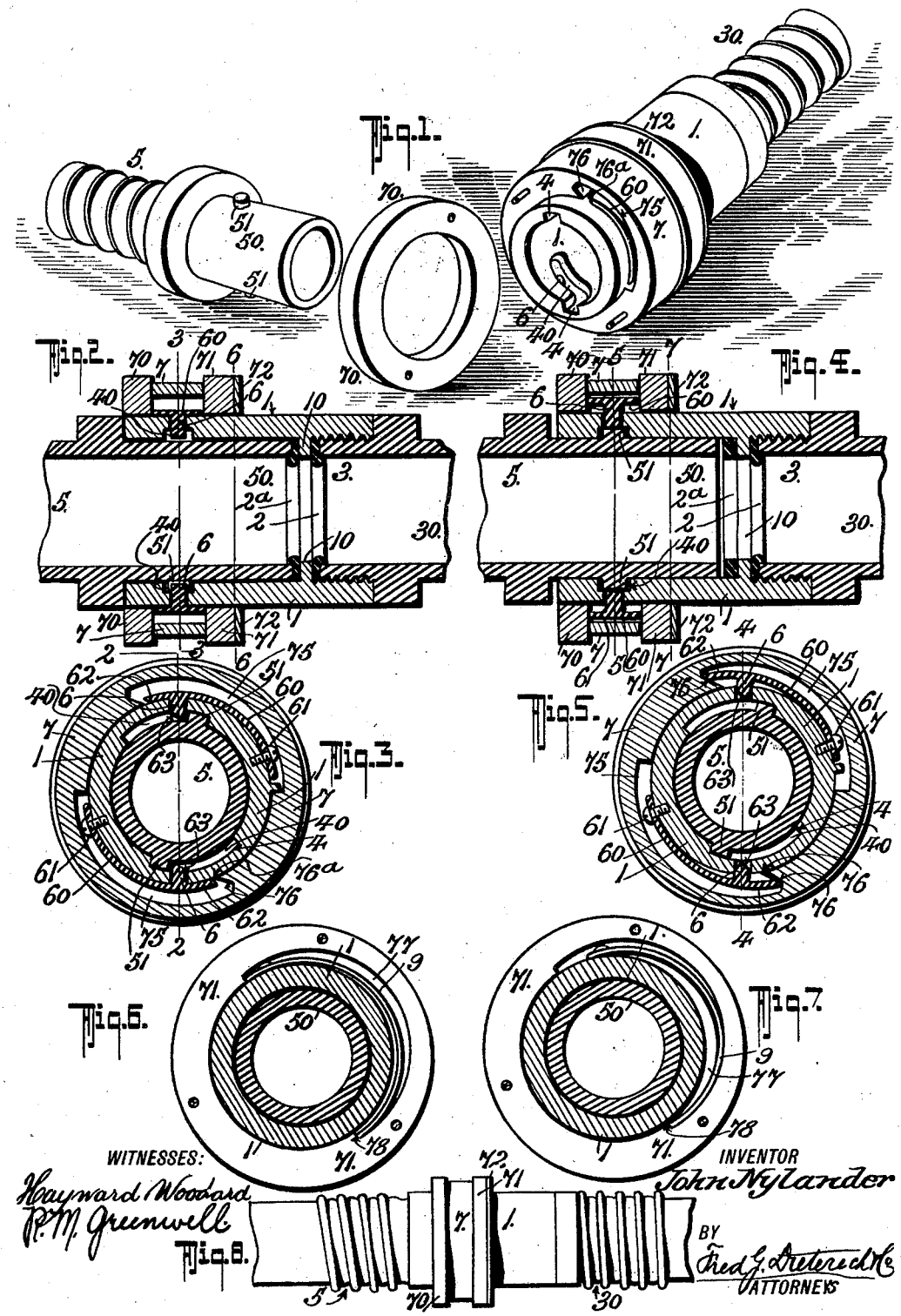

JOHN NYLANDER, OF MUSKEGON, MICHIGAN.

HOSE-COUPLING.

1,029,819.  Specification of Letters Patent.  Patented June 18, 1912.

Application filed October 23, 1911. Serial No. 656,280.

*To all whom it may concern:*

Be it known that I, JOHN NYLANDER, residing at Muskegon, in the county of Muskegon and State of Michigan, have invented a new and Improved Hose-Coupling, of which the following is a specification.

This invention relates to that class of coupling devices in which the opposing members have interlocking portions, adapted, under one adjustment, to snap into a locked engagement and under another adjustment to be disengaged and readily separated.

My invention has for its object to provide a hose coupling of the general character stated of a simple and economical construction, in which the coöperating parts are especially so designed that the operation of coupling is easily effected without the use of screws and the like, in which the parts are held water-tight and so arranged that the packing can be easily replaced when worn.

My invention consists in the improved construction and novel arrangement of the parts hereinafter fully described, specifically pointed out in the appended claims and illustrated in the accompanying drawing, in which:

Figure 1, is a perspective view of my improved hose coupling, parts being separated to the better illustrate their construction. Fig. 2, is a longitudinal section thereof taken on the line 2—2 of Fig. 3, the parts being in their locked position. Fig. 3, is a transverse section of the same on the line 3—3 on Fig. 2. Fig. 4, is a longitudinal section of the coupling device taken on the line 4—4 on Fig. 5, the spring detent being shown pulled back to release the lug carrying nipple. Fig. 5, is a cross section of the same on line 5—5 on Fig. 4. Fig. 6, is a cross section taken on the line 6—6 on Fig. 2. Fig. 7, is a similar view on the line 7—7 on Fig. 4. Fig. 8, is a side view of the complete coupling.

In carrying out my invention, I provide a coupling member consisting of a tubular body 1 provided near one end with an annular internal flange 10 that forms a seat for the packing rings 2—2ª, one for each side thereof and that end of the said body near the flange 10, is internally threaded to receive the threaded end 3 of one of the hose nipples 30 that is held water-tight on the body 1 by screwing it tightly against the packing ring 2. The end of the coupling member 1, opposite the threaded end, has a pair of oppositely disposed bayonet recesses 4—4, the transverse portions 40—40 of which incline toward the packing ring 2ª whereby to draw the nipple 50 of the hose section 5 tightly against the said ring 2ª when the said nipple 50 is coupled to the member 1.

51 designates the locking pins on the nipple 50 that engage the bayonet recesses 4 and 6—6 designate snap locking lugs that project through the member 1 into the portions 40 of the bayonet recesses, they being normally thrust into the said recesses by the leaf springs 60 secured on the outside of the member 1, as best shown in Figs. 3 and 5 by reference to which it will be noticed the springs have one end secured by the rivets 61—61 and have their free ends 62 slightly turned out for positively engaging with lifter cams presently again referred to. To facilitate the snap action of the lugs they have one edge 63 beveled. So far as described it will be readily apparent that by inserting the nipple 50 into the coupling member 1 with the lugs 6 pushed into the bayonet recesses 4 and giving the nipple a slight rotary movement, the pins 51 will slip over the lug 6 and the latter when the pins 51 pass them, snap back and hold the nipple from being turned off the member.

To provide for readily uncoupling the hose sections, I use a sleeve that is loosely mounted upon the member 1 and the said sleeve comprises a central ring 9, end cap rings 70—71 and a removable face ring 72. When the parts are assembled for use the several rings 7, 70, 71 and 72 are riveted or otherwise held together to cause them to move as one body. The central ring 7 is cored out at diametrically opposite sides to form recesses 75 in which the free ends of the leaf springs play when they are pushed out by the diametrically opposite lifter cams 76, they having knife edges 76ª for riding under the free end of the leaf springs when the ring is rotated on the member 1. The cap ring 71 has a partial annular recess 77 having a stop shoulder 78 and in this recess plays a leaf spring 9, one end of which is fastened to the tubular body 1. Spring 9 is bow-shaped to fit closely around the member 1 and its free end engages the stop shoulder 78, the purpose of the spring being to return the ring members to their normal position, after they have been manually turned to unlock the snap lugs from the locking pins 51.

The manner in which the coupling of the parts is effected is explained as follows: The nipple 50 is inserted into the member 1, is turned until the pins 51 pass over the detents 6, it being understood that the inclination of the bayonet recesses causes the end of the nipple 50 to compress the packing ring 2, the parts then being as shown in Figs. 2, 3 and 6. To uncouple the parts the unlocking ring is positively rotated in the member 1, in the direction indicated by the arrows on Figs. 3 and 6, which causes the cams 76 to lift the lugs 6 back to the position shown in Fig. 5 and frees the nipple 50 which can then be freely turned and pulled out of the member 1. In turning the ring as stated, the spring is turned up, as shown in Fig. 7, and put under sufficient tension to return the ring and the lifter cams to the normal position, shown in Fig. 3.

What I claim is:

1. In a hose coupling, the combination with a tubular member, a nipple insertible into the tubular member, a bayonet joint for holding the said nipple and the tubular member together; of a spring latch for holding the bayonet joint locked, said latch being mounted on the tubular member, and a ring encircling the tubular member, and rotatable thereon and a wedge device carried by said ring for engaging and releasing the spring latch from the bayonet joint when turned in one direction.

2. In a hose coupling, the combination with a tubular member, a nipple insertible into the tubular member, a bayonet joint for holding the said nipple and the tubular member together; of a spring latch for holding the bayonet joint locked, said latch being mounted on the tubular member, and a ring encircling the tubular member, and rotatable thereon, a wedge device carried by and in said ring for releasing the spring latch from the bayonet joint when turned in one direction, and a spring device for returning the said ring to its normal position.

3. In a hose coupling, two coupling members, having a bayonet joint connection between the same, a leaf spring mounted on one of said sections, and having a lug to engage the bayonet lug of the other section to lock said bayonet joint, a ring rotatably mounted on said spring carrying section and having a chamber to inclose said spring, said ring having a wedge portion to engage the free end of said spring when said ring is turned in one direction, to move said spring to release said bayonet joint, substantially as shown and described.

4. In a hose coupling, two coupling members, having a bayonet joint connection between the same, a leaf spring mounted on one of said sections, and having a lug to engage the bayonet lug of the other section to lock said bayonet joint, a ring rotatably mounted on said spring carrying section and having a chamber to inclose said spring, said ring having a wedge portion to engage the free end of said spring when said ring is turned in one direction, to move said spring to release said bayonet joint, means for limiting the turning movement of said ring in one direction, and a second leaf spring mounted on first mentioned coupling section and engaging said ring to move said ring in a direction to normally hold said wedge out of contact with said first mentioned spring.

5. In a hose coupling, a male and a female section, said male section having a lug, and said female section having a slot, a ring-like member mounted on said female section, and having two distinct chamber portions, a spring latch mounted on said female section in one of said chamber portions, and having a lug to project into said slot and lock said male section lug, said ring-like member having a portion normally disengaged from said latch for engaging and lifting said latch to release said coupling when said ring-like member is moved in one direction, and means mounted in the other chamber of said ring-like member for continuously tending to turn said ring-like member to its non-releasing position.

6. In a hose coupling, a male and a female section, said female section having a slot, and said male section having a lug to enter said slot to couple said sections together, a spring latch mounted on said female section, and having a lug to project into said slot and engage said male section lug to lock the coupling, a ring-like housing member mounted on said female section, and having a chamber to inclose said spring latch, said ring-like member having a wedge portion projecting into said chamber to engage said spring latch and effect its release when said ring-like member is turned in one direction, said spring latch coöperating with said wedge-like member to restore said ring-like member to its initial position when it is free to move, and means for limiting the movement of said ring-like member between predetermined limits.

7. In a hose coupling, a male and a female section, said female section having a slot, and said male section having a lug to enter said slot to couple said sections together, a spring latch mounted on said female section, and having a lug to project into said slot and engage said male section lug to lock the coupling, a ring-like housing member mounted on said female section, and having a chamber to inclose said spring latch, said ring-like member having a wedge portion projecting into said chamber to engage said spring latch and effect its release when said ring-like member is turned in one direction, said spring latch coöperating with said wedge-like member to restore said ring-like member to its initial position when it is free to move, and means for limiting the movement of said ring-like member between predetermined limits, other means mounted within said ring-like member and coöperatively engaging said ring-like member and said female coupling section for restoring said ring-like member to its initial position independently of said spring latch.

JOHN NYLANDER.

Witnesses:
 JEROME E. TURNER,
 BENJ. H. TELLMAN.